(12) United States Patent  
Belmonte et al.

(10) Patent No.: US 9,371,742 B2
(45) Date of Patent: Jun. 21, 2016

(54) SET OF ROTOR DISKS FOR A TURBINE ENGINE

(75) Inventors: Olivier Belmonte, Perthes en Gatinais (FR); Ludovic Gallego, Paris (FR); Lionel Rene Henri Weller, Champcueil (FR)

(73) Assignee: SNECMA, Paris (FR)

( * ) Notice: Subject to any disclaimer, the term of this patent is extended or adjusted under 35 U.S.C. 154(b) by 523 days.

(21) Appl. No.: 13/882,058

(22) PCT Filed: Oct. 25, 2011

(86) PCT No.: PCT/FR2011/052483
§ 371 (c)(1),
(2), (4) Date: Apr. 26, 2013

(87) PCT Pub. No.: WO2012/056161
PCT Pub. Date: May 3, 2012

(65) Prior Publication Data
US 2013/0209238 A1 Aug. 15, 2013

(30) Foreign Application Priority Data
Oct. 28, 2010 (FR) ..................................... 10 58901

(51) Int. Cl.
*F01D 25/12* (2006.01)
*F01D 5/06* (2006.01)
(Continued)

(52) U.S. Cl.
CPC ................ *F01D 25/12* (2013.01); *F01D 5/066* (2013.01); *F01D 5/081* (2013.01); *F01D 11/005* (2013.01); *Y02T 50/676* (2013.01)

(58) Field of Classification Search
CPC ........... F01D 5/06; F01D 5/063; F01D 5/066; F01D 5/3007; F01D 5/3015; F01D 11/001; F01D 11/005; F01D 11/006; F01D 11/008
USPC ....................................... 415/173.7
See application file for complete search history.

(56) References Cited

U.S. PATENT DOCUMENTS 2,662,685 A 12/1953 Blanc
2,860,851 A * 11/1958 Halford ..................... F01D 5/06
415/173.7
(Continued)

FOREIGN PATENT DOCUMENTS

DE 102008048006 A1 * 3/2010 ............. F01D 5/066
EP 1 079 070 2/2001
(Continued)

OTHER PUBLICATIONS

International Search Report Issued Mar. 7, 2012 in PCT/FR11/52483 Filed Oct. 25, 2011.

*Primary Examiner* — Igor Kershteyn
*Assistant Examiner* — Christopher R Legendre
(74) *Attorney, Agent, or Firm* — Oblon, McClelland, Maier & Neustadt, L.L.P.

(57) ABSTRACT

A set of rotor disks for a turbine engine, or an airplane turboprop or turbojet, the set including disks rigidly connected together by bolts and shaped at their outer peripheries with slots for mounting blade roots. Each disk includes a rim extending radially and not having any axial flanges, two consecutive disks being connected together with help of an axially-extending ferrule that is fastened to the rims of the disks and that is fitted with a holder plate for holding the blade roots of the downstream disk.

10 Claims, 2 Drawing Sheets

(51) Int. Cl.
*F01D 5/08* (2006.01)
*F01D 11/00* (2006.01)

(56) References Cited

U.S. PATENT DOCUMENTS

| | | | | |
|---|---|---|---|---|
| 3,146,938 | A * | 9/1964 | Smith | F01D 11/001 415/173.7 |
| 3,428,243 | A * | 2/1969 | Britt | F01D 5/06 415/111 |
| 3,451,653 | A * | 6/1969 | Koff | F01D 5/06 415/178 |
| 3,597,110 | A * | 8/1971 | Corsmeier | F01D 5/066 411/337 |
| 4,088,422 | A * | 5/1978 | Martin | F01D 5/06 415/173.7 |
| 4,220,055 | A * | 9/1980 | Dubois | F01D 5/027 464/180 |
| 4,655,683 | A * | 4/1987 | Chaplin | G01D 11/18 415/137 |
| 4,723,889 | A * | 2/1988 | Charreron | F01D 5/22 416/193 A |
| 5,630,703 | A * | 5/1997 | Hendley | F01D 5/081 416/220 R |
| 5,918,356 | A * | 7/1999 | Guerin | B23P 19/04 269/71 |
| 6,655,920 | B2 * | 12/2003 | Beutin | F01D 5/063 415/199.5 |
| 7,008,190 | B2 * | 3/2006 | Brault | F01D 5/066 416/198 A |
| 7,241,109 | B2 * | 7/2007 | Ferra | F01D 5/081 415/174.5 |
| 8,757,980 | B2 * | 6/2014 | Belmonte | F01D 5/06 416/198 A |
| 2003/0133803 | A1 | 7/2003 | Brault et al. | |
| 2013/0209238 | A1 * | 8/2013 | Belmonte | F01D 5/066 415/116 |

FOREIGN PATENT DOCUMENTS

| | | | | |
|---|---|---|---|---|
| EP | 1 329 589 | | 7/2003 | |
| FR | 2965291 | A1 * | 3/2012 | F01D 5/082 |
| FR | 2971004 | A1 * | 8/2012 | F01D 5/06 |
| WO | WO 2005052321 | A1 * | 6/2005 | F01D 5/066 |

* cited by examiner

SET OF ROTOR DISKS FOR A TURBINE ENGINE

BACKGROUND OF THE INVENTION

1. Field of the Invention

The present invention relates to a set of rotor disks for a turbine engine such as an airplane turboprop or turbojet.

2. Description of the Related Art

In a conventional turbine engine, as described in document EP 2 009 235 in the name of the Applicant, the rotor of the turbine comprises a plurality of disks with slots formed in their peripheries for receiving blade roots. The disks are centered on the axis of the engine and they are connected together and to a turbine shaft by upstream and downstream flanges, the downstream flange of an upstream disk being fastened to the upstream flange of a downstream disk by means of bolts.

An annular holder plate for holding blade roots is fastened to the upstream flange of the downstream disk and extends over the slots of the disk so as to form an axial abutment for the blade roots mounted in the disk.

This plate also carries wipers for co-operating with blocks of abradable material mounted on stationary vanes of a guide vane stage situated axially between the two above-mentioned disks, one upstream and the other downstream. The wipers and the abradable blocks form sealing means of the labyrinth seal type.

An annular space is defined between the plate and the upstream flange of the downstream disk and it is fed upstream with air that is guided to the slots of the downstream disk in order to cool them.

The disks are machined from respective raw forgings that present axial dimensions that are considerable, as required for forming the flanges that extend upstream and downstream. The machining time and the cost that result therefrom are very great.

In order to limit manufacturing costs, it is known to use disks having a radial rim that does not have any axial flanges. Two disks of that type are then connected together by means of a disk of another type that is interposed axially between them, which disk of the other type has upstream and downstream flanges of great length. Although the amount of machining required for the disks that do not have any flanges is greatly reduced, the machining required for the intermediate disks having flanges remains very great.

The ferrules carrying the wipers also need to be redefined, given the structural modifications made to the disks.

BRIEF SUMMARY OF THE INVENTION

A particular object of the invention is to provide a solution to this problem that is simple, effective, and inexpensive.

To this end, the invention provides a set of rotor disks for a turbine engine such as an airplane turboprop or turbojet, the set comprising disks that are rigidly connected together by bolts and that are shaped at their outer peripheries with slots for mounting blade roots, the set being characterized in that each disk is formed by a rim extending radially and not having any axial flanges, two consecutive disks being connected together with the help of an axially-extending ferrule that is fastened to the rims of the disks and that is fitted with a holder plate for holding the blade roots of the downstream disk, and in that the ferrule includes cooling openings near its downstream end, said openings opening out into a ventilation space formed upstream from the downstream disk and defined by the ferrule and the plate for holding the blade roots.

In this way, none of the disks need have any flanges, thereby making them easier to fabricate by machining. The ferrules may be subjected to rolling using presser wheels, thereby reducing the thickness of material that needs to be machined. The machining of the ferrules is therefore faster and less expensive.

In addition, the cooling openings are effective in ensuring ventilation of the slots for mounting blade roots that are formed in the downstream disk.

Advantageously, balance weights are formed at the radially inner ends of the rims.

According to another characteristic of the invention, the axial ends of the ferrule include annular flanges fastened to the rims of the upstream and downstream disks with the help of bolts.

In preferred manner, the ferrule has a frustoconical or cylindrical middle portion and cylindrical margins at its upstream and downstream ends, these margins being pressed radially against the rims of the upstream and downstream disks.

The ferrule may include a middle portion formed to have wipers for co-operating with blocks of abradable material mounted on stationary vanes of a guide vane stage.

Preferably, the middle portion includes a cylindrical ledge extending upstream and carrying the wipers.

In an embodiment of the invention, the plate for holding the blade roots of the downstream disk is formed integrally with the ferrule.

In another embodiment of the invention, the holder plate is a part that is separate from the ferrule and that is mounted to bear between an outwardly extending annular bead of the ferrule and the downstream disk.

The invention also provides a turbine engine, such as an airplane turboprop or turbojet, the engine including a low pressure turbine in which the rotor disks are formed by a set of disks of the above-specified type.

BRIEF DESCRIPTION OF THE SEVERAL VIEWS OF THE DRAWINGS

The invention can be better understood and other details, characteristics, and advantages of the invention appear on reading the following description given by way of non-limiting example and with reference to the accompanying drawings, in which.

DETAILED DESCRIPTION OF THE INVENTION

Figure 1:
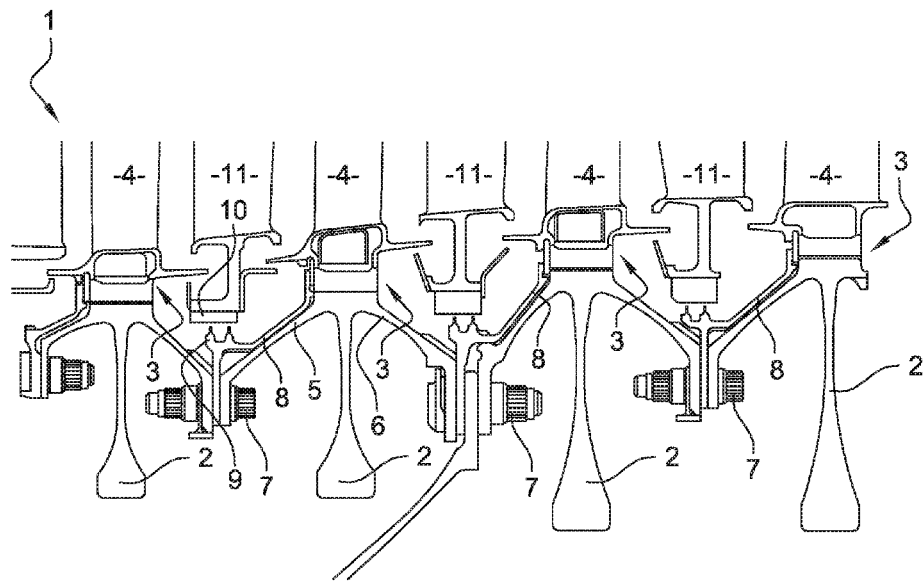
FIG. 1 is a fragmentary view in axial section of a set of rotor disks, in a first embodiment of the prior art.

A first embodiment of a prior art turbine rotor 1 is shown in FIG. 1. This rotor 1 comprises a plurality of disks 2 having slots 3 made in their peripheries for mounting blade roots 4. The disks 2 are centered on the axis of the turbine engine and they are connected to one another and to a turbine shaft by upstream and downstream flanges 5, 6, the downstream flange 6 of an upstream disk 2 being fastened to the upstream flange 5 of a downstream disk 2 by means of bolts 7.

An annular plate 8 for holding the blade roots 4 is fastened by the bolts 7 to the upstream flange 5 of the downstream disk 2 and it extends so as to overlie the slots in the disk and thus form an axial abutment for the blade roots 4 of the disk 2.

The plate 8 also includes wipers 9 for co-operating with blocks of abradable material 10 mounted on stationary vanes 11 of a set of guide vanes situated axially between the two above-mentioned disks 2, one upstream and the other downstream. The wipers 9 and the abradable blocks 10 form sealing means of the labyrinth seal type.

An annular space is defined between the plate 8 and the upstream flange 5 of the downstream disk 2 and it is fed from upstream with air that is guided to the slots of the downstream disk 2 for cooling them.

Each disk 2 is machined from a raw forging of large axial dimensions as are required for forming the flanges 5, 6 that extend upstream and downstream. The time required and the cost of machining as a result thereof are very large.

Figure 2:
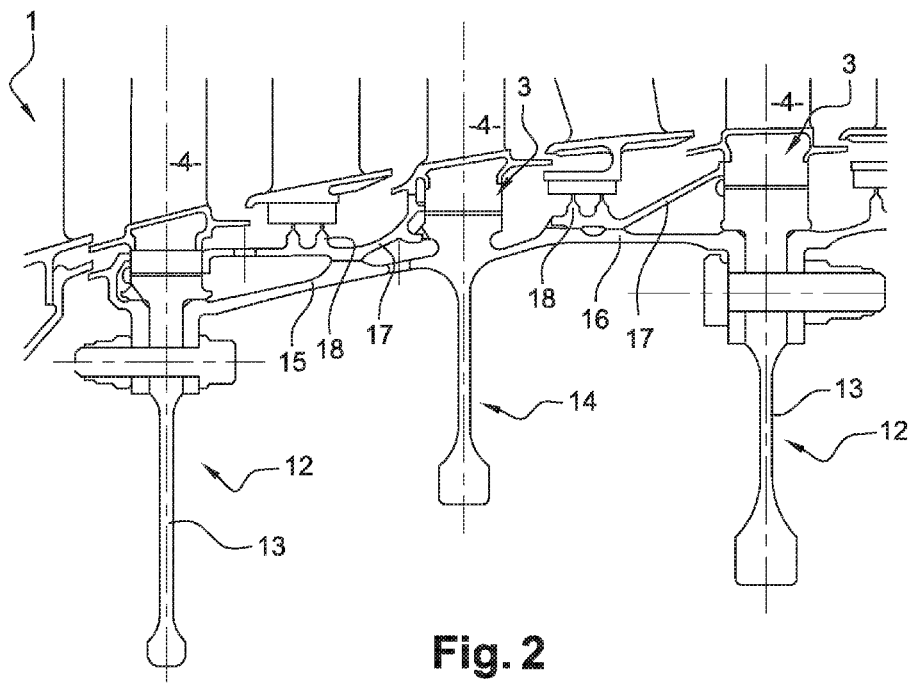
FIG. 2 is a fragmentary view in axial section of a set of rotor disks, in a second embodiment of the prior art.

A second embodiment of a prior art turbine rotor 1 is shown in FIG. 2. This rotor 1 has disks 12, each having a radial rim 13 without any axial flanges. Two disks 12 of this type are then connected together by means of a disk 14 of another type that is interposed axially between them and that has upstream and downstream flanges 15 and 16 of very great length. Ferrules 17 carrying wipers 18 are interposed axially between two disks 12 and are constrained in rotation with the downstream disk 12 by dogs so as to rotate with the rotor 1.

Although the machining of the disks 12 that do not have flanges can be performed quickly and at low cost, the machining of the intermediate disks 14 remains very considerable since those disks have flanges 15, 16 that are very long.

Figure 3:
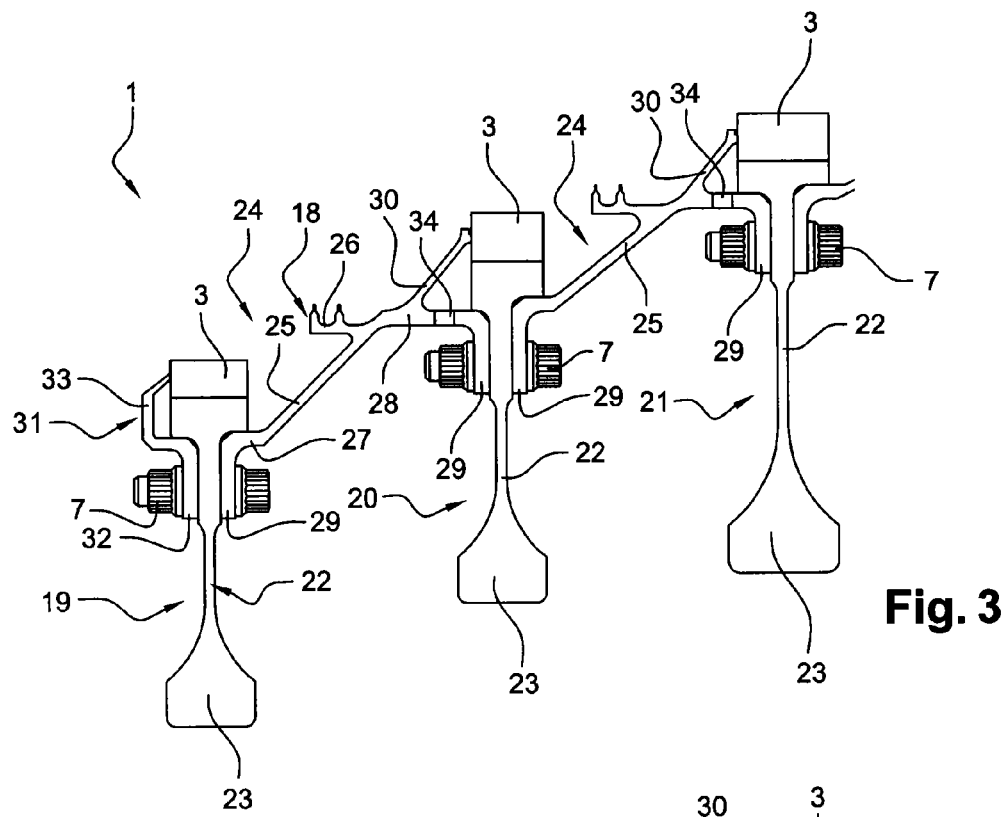
FIG. 3 is a fragmentary view in axial section of a set of rotor disks in a first embodiment of the invention.

In order to limit such machining, the invention proposes a set of rotor disks 1, in particular for a low pressure turbine of a turbine engine, with a first embodiment thereof being shown in FIG. 3. This set comprises rotor disks 19, 20, 21 that are securely connected together by bolts and that have slots 3 formed in their outer peripheries for mounting blade roots. Each disk 19, 20, or 21 is formed by a radial rim 22 that does not have any axial flanges. Balance weights 23 are formed at the radial inner ends of the rims 22.

Consecutive disks are connected together by ferrules 24 that extend axially and that are fastened to the rims 22 of the disks by bolts.

Each ferrule 24 has a frustoconical middle portion 25 carrying a cylindrical ledge 26 extending upstream and carrying wipers 18 for co-operating with blocks of abradable material mounted on a stationary guide vane stage, in the same manner as before.

The ferrule 24 also has cylindrical margins 27 and 28 at its upstream and downstream ends, these margins being pressed radially against the rims 22 of the upstream and downstream disks 19, 20, and 21. Annular flanges 29 extend radially inwards from these margins 27 and 28 and are fastened to the rims 22 of the upstream and downstream disks with the help of bolts 7.

The ferrule 24 also has a frustoconical plate 30 for holding the blade roots of the downstream disk, which plate is formed integrally with the ferrule 24 in this embodiment, the plate 30 extending downstream and outwards from the downstream margin 28.

The assembly of the invention also has an upstream plate 31 presenting an annular portion 32 pressed against the rim 22 of the upstream disk 19 and a portion 33 of hook-shaped section for holding the blade roots in the slots 3 of the upstream disk 19.

Air-passing holes 34 may be formed in the downstream margin 28 of each ferrule in order to cool the blade roots housed in the slots 3.

Figure 4:
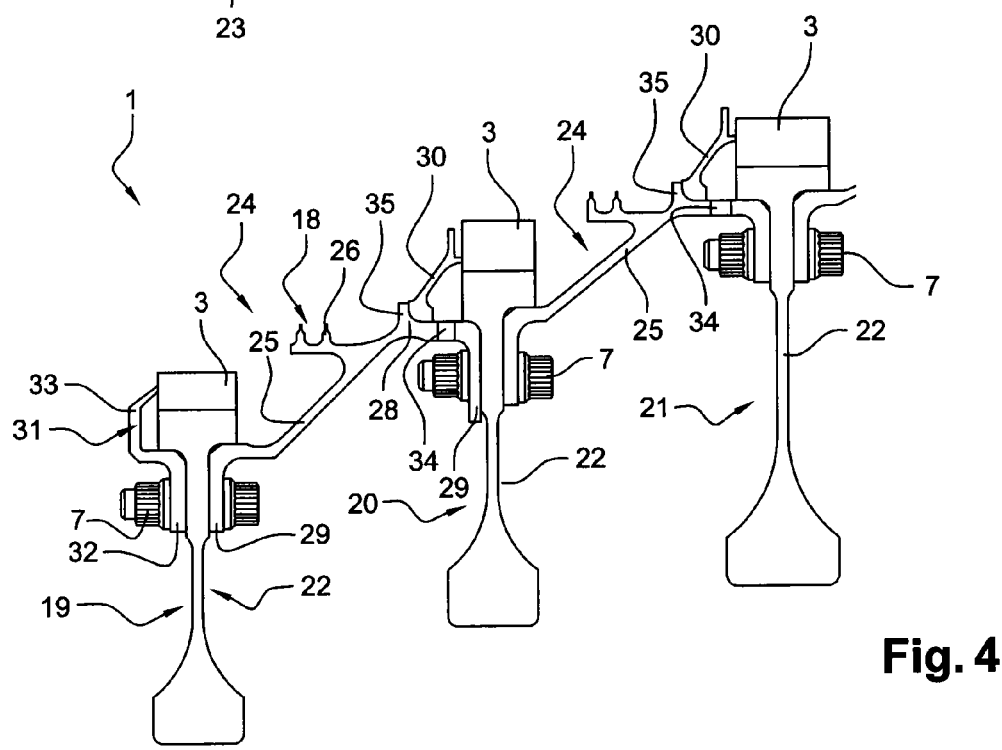
FIG. 4 is a view corresponding to FIG. 1, showing a second embodiment of the invention.

FIG. 4 shows a second embodiment that differs from the embodiment of FIG. 3 in that the holder plate 30 is a part that is separate from the ferrule 24, is generally frustoconical in shape, and is mounted to bear between an outwardly-projecting annular bead 35 of the ferrule 24 and the downstream disk.

This embodiment enables the holder plate 30 to be made of a material that is different from that of the ferrule 24. The hot zones are situated close to the axis of the rotor, i.e. level with the holder plates 30. These plates must therefore be made of a material that withstands high temperatures. The other zones of the ferrule 24 are subjected to temperatures that are lower, but that are subjected to high levels of mechanical stress. They therefore need to be made of a material that can accept such stresses.

Whatever the embodiment, the invention makes it possible to reduce considerably the amount of machining required by the disks 19, 20, and 21, thereby reducing their cost and the time taken to fabricate them. None of the disks 19, 20, and 21 has flanges, such that the forging that is to be machined in order to obtain the disks presents outlines that are very close to its final outlines.

The ferrules 24 are easier to machine, in particular because they can be rolled prior to machining so that the outline of the part after rolling is close to the outline that is to be obtained.

The invention claimed is:

1. A set of rotor disks for a turbine engine, or an airplane turboprop or a turbojet, the set comprising:
   an upstream disk and a downstream disk rigidly connected together by bolts and shaped at outer peripheries thereof with slots for mounting blade roots, each disk including a rim extending radially and free of any axial flanges; and
   an axially-extending ferrule that is fastened to the rims of the disks and that is fitted with a holder plate for holding blade roots of the downstream disk,
   wherein the ferrule includes a frustoconical middle portion, an upstream cylindrical margin at an upstream end of the ferrule, and a downstream cylindrical margin at a downstream end of the ferrule, the upstream and downstream cylindrical margins being pressed against the rims of the upstream and downstream disks, respectively, and the downstream end of the ferrule being radially outward of the upstream end of the ferrule, and
   wherein the ferrule includes cooling openings near the downstream end, the openings opening out into a ventilation space formed upstream from the downstream disk and defined by the ferrule and the holder plate for holding the blade roots.

2. A set according to claim 1, further comprising balance weights formed at radially inner ends of the rims.

3. A set according claim 1, wherein the axial ends of the ferrule include annular flanges fastened to the rims of the upstream and downstream disks via the bolts.

4. A set according to claim 1, wherein the middle portion includes wipers for co-operating with blocks of abradable material mounted on stationary vanes of a guide vane stage.

5. A set according to claim 4, wherein the middle portion includes a cylindrical ledge extending upstream and carrying the wipers.

6. A set according to claim 1, wherein the holder plate for holding the blade roots of the downstream disk is formed integrally with the ferrule.

7. A set according to claim 1, wherein the holder plate is a you that is separate from the ferrule and that is mounted to bear between an outwardly extending annular bead of the ferrule and the downstream disk.

8. A set according to claim 1, wherein each of the upstream and downstream disks includes a shoulder against which the upstream and downstream cylindrical margins radially abut, respectively.

9. A set according to claim 1, further comprising an upstream plate including an annular portion pressed against the rim of the upstream disk and a portion for holding blade roots in the slots of the upstream disk.

10. A turbine engine, an airplane turboprop, or a turbojet, comprising a low pressure turbine in which the rotor disks are formed by a set of disks according to claim 1.

* * * * *